United States Patent
Soramoto et al.

(10) Patent No.: US 8,482,275 B2
(45) Date of Patent: Jul. 9, 2013

(54) PHYSICAL QUANTITY DETECTION CIRCUIT FOR ALLOWING PRECISE ADJUSTMENT OF THE PHASE RELATIONSHIP BETWEEN A SENSOR SIGNAL AND A DETECTION SIGNAL

(75) Inventors: Takao Soramoto, Kyoto (JP); Hitoshi Kobayashi, Osaka (JP)

(73) Assignee: Panasonic Corporation, Osaka (JP)

( * ) Notice: Subject to any disclaimer, the term of this patent is extended or adjusted under 35 U.S.C. 154(b) by 307 days.

(21) Appl. No.: 12/840,738

(22) Filed: Jul. 21, 2010

(65) Prior Publication Data

US 2010/0289480 A1 Nov. 18, 2010

Related U.S. Application Data

(63) Continuation of application No. PCT/JP2008/003394, filed on Nov. 19, 2008.

(30) Foreign Application Priority Data

May 22, 2008 (JP) .................................. 2008-134708

(51) Int. Cl.
G01R 25/00 (2006.01)
(52) U.S. Cl.
USPC ........................................ 324/76.11; 324/85
(58) Field of Classification Search
None
See application file for complete search history.

(56) References Cited

U.S. PATENT DOCUMENTS

| 4,671,112 | A | 6/1987 | Kimura et al. | |
|---|---|---|---|---|
| 5,197,331 | A | 3/1993 | Oikawa | |
| 6,121,811 | A | 9/2000 | Scott et al. | |
| 6,538,517 | B2 * | 3/2003 | Lu | 331/17 |
| 6,993,445 | B2 * | 1/2006 | Clarke et al. | 702/106 |
| 2003/0030425 | A1 * | 2/2003 | Delbo et al. | 324/76.53 |
| 2007/0047689 | A1 * | 3/2007 | Menolfi et al. | 375/376 |
| 2011/0179868 | A1 * | 7/2011 | Kaino et al. | 73/504.12 |

FOREIGN PATENT DOCUMENTS

| JP | 07-146151 | 6/1995 |
|---|---|---|
| JP | 07-146151 A | 6/1995 |
| JP | 7-231243 | 8/1995 |
| JP | 07-332986 | 12/1995 |
| JP | 7-332986 A | 12/1995 |
| JP | 08-014916 | 1/1996 |
| JP | 8-014916 A | 1/1996 |
| JP | 11-044585 | 2/1999 |
| JP | 11-044585 A | 2/1999 |
| JP | 2003-078395 | 3/2003 |
| JP | 2005-098932 | 4/2005 |
| JP | 2008-014932 | 1/2008 |
| JP | 2008-014932 A | 1/2008 |

* cited by examiner

Primary Examiner — Vinh Nguyen
(74) Attorney, Agent, or Firm — McDermott Will & Emery LLP

(57) ABSTRACT

A PLL circuit generates a plurality of oscillated clocks having different phases. A selector selects one of the plurality of oscillated clocks generated by the PLL circuit. A detection circuit detects a physical quantity signal corresponding to the physical quantity given to a physical quantity sensor from a sensor signal received from the physical quantity sensor based on the oscillated clock selected by the selector.

2 Claims, 17 Drawing Sheets

PHYSICAL QUANTITY DETECTION CIRCUIT FOR ALLOWING PRECISE ADJUSTMENT OF THE PHASE RELATIONSHIP BETWEEN A SENSOR SIGNAL AND A DETECTION SIGNAL

This is a continuation of PCT International Application PCT/JP2008/003394 filed on Nov. 19, 2008, which claims priority to Japanese Patent Application No. 2008-134708 filed on May 22, 2008. The disclosures of these applications including the specifications, the drawings, and the claims are hereby incorporated by reference in their entirety.

BACKGROUND

The technique disclosed herein relates to a physical quantity detection circuit used for a physical quantity sensor that detects a physical quantity given externally and to a physical quantity sensor device provided with the physical quantity detection circuit, and more particularly, to a technique of adjusting the phase relationship between a sensor signal and a detection signal.

Conventionally, physical quantity sensor devices capable of detecting a physical quantity (e.g., an angular velocity, an acceleration, etc.) are used in a variety of technical fields such as detection of shake of a digital camera, attitude control of a mobile unit (e.g., an aircraft, an automobile, a robot, a vessel, etc.), and guidance of a missile and a spacecraft.

In general, a physical quantity sensor device includes: a physical quantity sensor that outputs a sensor signal according to a physical quantity given externally; and a physical quantity detection circuit that detects a physical quantity signal (signal corresponding to the physical quantity) from the sensor signal using a detection signal (signal having a frequency corresponding to the frequency of the sensor signal). In such a physical quantity detection circuit, an unintentional phase shift may sometimes occur between the sensor signal and the detection signal due to fabrication variations (diffusion variations in resistances and capacitors, etc.) and fluctuations in the surrounding environment (e.g., changes in temperature, etc.). It is therefore important to adjust the phase relationship between the sensor signal and the detection signal to keep the sensor signal and the detection signal synchronized with each other.

To address the above problem, Japanese Patent Publication No. 8-14916 discloses a vibration gyro, provided with a phase correction circuit including a temperature-sensitive element (element having a predetermined temperature characteristic), to correct a phase shift caused by a temperature change.

SUMMARY

However, due to fabrication variations, the phase correction circuit does not always exhibit a desired temperature characteristic, and hence it has been difficult to set the phase correction amount precisely in the phase adjustment circuit. As such, conventionally, with the failure of precise adjustment of the phase relationship between the sensor signal and the detection signal, it has been difficult to improve the detection precision.

An object of the technique disclosed herein is adjusting the phase relationship between the sensor signal and the detection signal precisely.

According to one aspect of the present invention, the physical quantity detection circuit is a physical quantity detection circuit used for a physical quantity sensor that outputs a sensor signal according to a physical quantity given externally, the circuit including: a PLL circuit configured to generate a plurality of oscillated clocks having different phases; a selector configured to select one of the plurality of oscillated clocks generated by the PLL circuit; and a detection circuit configured to detect a physical quantity signal corresponding to the physical quantity from the sensor signal based on the oscillated clock selected by the selector, wherein the PLL circuit includes an oscillation circuit including a plurality of delay elements connected in a loop, configured to output the outputs of the plurality of delay elements as the plurality of oscillated clocks, a low-pass filter configured to generate a control voltage for controlling the delay time of the plurality of delay elements, a frequency divider configured to divide the frequency of one of the plurality of oscillated clocks to generate a divided clock, a phase frequency detection circuit configured to detect a phase difference between a reference clock corresponding to the sensor signal and the divided clock, and a charge pump configured to increase/decrease the control voltage based on the phase difference detected by the phase frequency detection circuit.

In the physical quantity detection circuit described above, the detection timing can be set using the phase shift amount of the oscillated clocks (i.e., the delay time of the delay elements) as the unit. Thus, the phase relationship between the sensor signal and the detection signal can be adjusted more precisely than conventionally done, permitting improvement in detection precision.

The detection circuit described above may include an analog-to-digital converter circuit configured to convert the sensor signal to a digital sensor signal, a detection signal generator circuit configured to generate a digital detection signal corresponding to a sine wave signal in synchronization with the oscillated clock selected by the selector, and a multiplier circuit configured to multiply the digital sensor signal obtained by the analog-to-digital converter circuit by the digital detection signal generated by the detection signal generator circuit, to detect the physical quantity signal.

The physical quantity detection circuit described above may further include a phase adjustment circuit, receiving the reference clock and operating in synchronization with an operation clock having a frequency higher than the frequency of the reference clock, configured to output a timing signal once a predetermined number of pulses of the operation clock has been generated after a transition edge of the reference clock, wherein the detection signal generator circuit starts generation of the digital detection signal in response to a transition edge of the timing signal.

In the physical quantity detection circuit described above, the standby time from a transition edge of the reference clock until start of detection can be set using the period of the operation clock as the unit. Thus, the adjustment width of the detection timing can be widened, permitting further improvement in detection precision.

The detection circuit described above may include a frequency division circuit configured to divide the frequency of the oscillated clock selected by the selector, to generate an analog detection signal, and a sync detection circuit configured to detect the physical quantity signal from the sensor signal using the analog detection signal generated by the frequency division circuit.

The physical quantity detection circuit described above may further include: a phase adjustment circuit, receiving the reference clock and operating in synchronization with an operation clock having a frequency higher than the frequency of the reference clock, configured to output a timing signal once a predetermined number of pulses of the operation clock has been generated after a transition edge of the reference clock, wherein the frequency division circuit starts generation of the analog detection signal in response to a transition edge of the timing signal.

According to another aspect of the present invention, the physical quantity detection circuit is a physical quantity detection circuit used for a physical quantity sensor that outputs a sensor signal according to a physical quantity given externally, the circuit including: a DLL circuit configured to generate a plurality of delayed clocks having different phases; a selector configured to select one of the plurality of delayed clocks generated by the DLL circuit; and a detection circuit configured to detect a physical quantity signal corresponding to the physical quantity from the sensor signal based on the delayed clock selected by the selector, wherein the DLL circuit includes a delay circuit including a plurality of cascade-connected delay elements for delaying a reference clock corresponding to the sensor signal, configured to output the outputs of the plurality of delay elements as the plurality of delayed clocks, a low-pass filter configured to generate a control voltage for controlling the delay time of the plurality of delay elements, a phase frequency detection circuit configured to detect a phase difference between the reference clock and one of the plurality of delayed clocks, and a charge pump configured to increase/decrease the control voltage based on the phase difference detected by the phase frequency detection circuit.

In the physical quantity detection circuit described above, the detection timing can be set using the phase shift amount of the delayed clocks (i.e., the delay time of the delay elements) as the unit. Thus, the phase relationship between the sensor signal and the detection signal can be adjusted more precisely than conventionally done, permitting improvement in detection precision.

The physical quantity detection circuit described above may further include: a frequency multiplication circuit configured to multiply the reference clock to generate a multiplied clock, wherein the plurality of delay elements of the delay circuit delay the multiplied clock, and the phase frequency detection circuit detects a phase difference between the multiplied clock and one of the plurality of delayed clocks.

DETAILED DESCRIPTION

Figure 1:
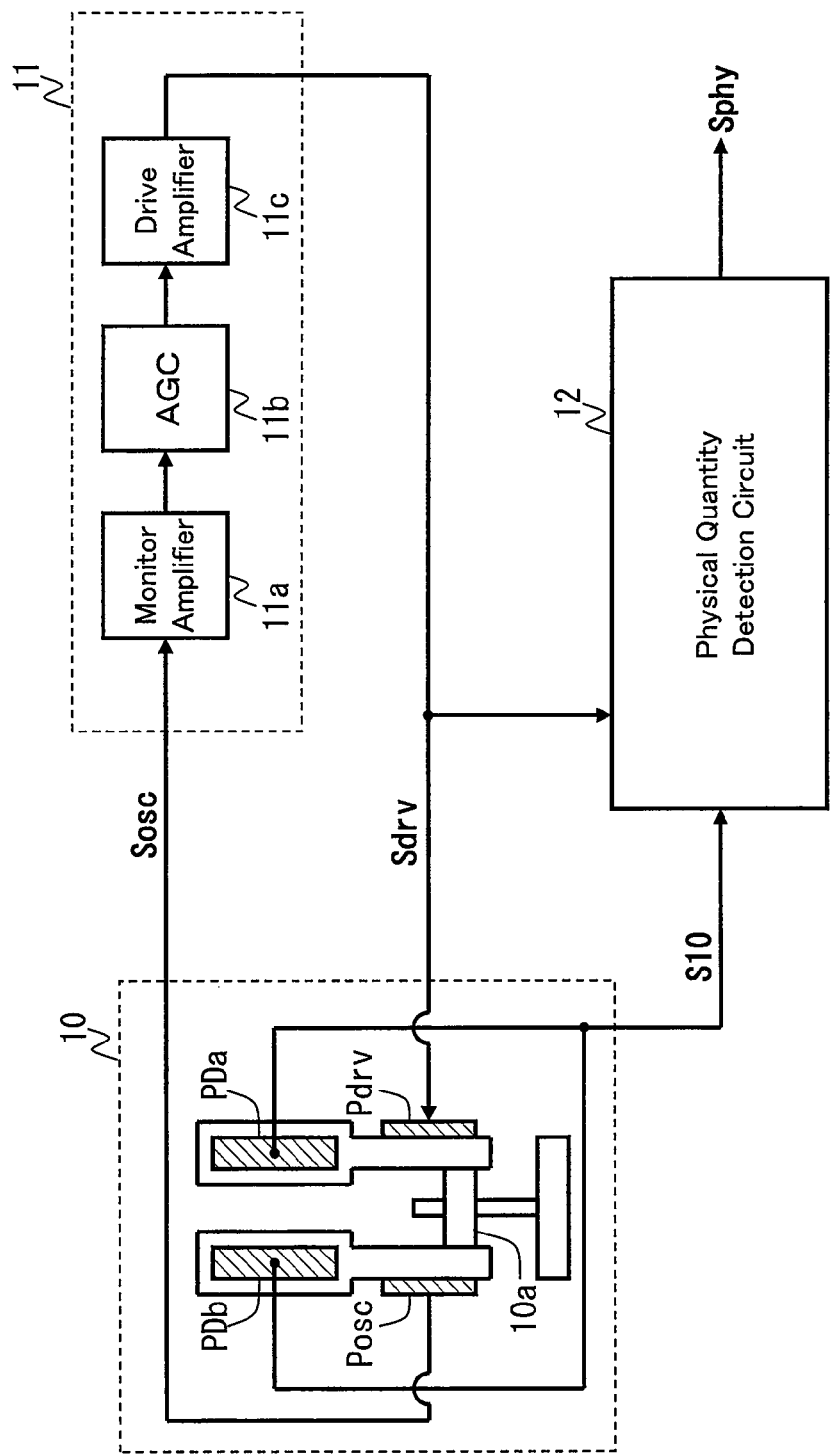
FIG. 1 is a block diagram showing an example configuration of a physical quantity sensor device of a first embodiment.

Preferred embodiments will be described in detail hereinafter with reference to the accompanying drawings. It should be noted that identical or equivalent components are denoted by the same reference characters throughout the drawings, and description of such components will not be repeated in some cases.

First Embodiment

FIG. 1 shows a configuration of a physical quantity sensor device of a first embodiment. The physical quantity sensor device includes a physical quantity sensor 10, a drive circuit 11, and a physical quantity detection circuit 12. The physical quantity sensor 10 receives a drive signal Sdrv having a predetermined frequency from the drive circuit 11, and outputs a sensor signal S10 according to a physical quantity (e.g., an angular velocity, an acceleration, etc.) given externally. The frequency of the sensor signal S10 corresponds to the frequency of the drive signal Sdrv. For example, the center frequency of the sensor signal S10 is equal to the frequency of the drive signal Sdrv. Assume in this embodiment that the physical quantity sensor 10 is a tuning fork type angular velocity sensor. The drive circuit 11 supplies the drive signal Sdrv to the physical quantity sensor 10. The drive circuit 11 also adjusts the frequency and amplitude of the drive signal Sdrv according to an oscillation signal Sosc from the physical quantity sensor 10. The physical quantity detection circuit 12 detects the physical quantity based on the sensor signal S10 from the physical quantity sensor 10.

[Physical Quantity Sensor]

The physical quantity sensor 10 includes a tuning fork body 10*a*, a drive piezoelectric element Pdrv, an oscillation detection piezoelectric element Posc, and angular velocity detection piezoelectric elements PDa and PDb. The tuning fork body 10*a* has two prongs each twisted by the right angle in the center, a connection for connecting the two prongs at their ends on one side, and a support pin provided at the connection to serve as a rotation axis. The drive piezoelectric element Pdrv oscillates the prong for driving according to the frequency and amplitude of the drive signal Sdrv supplied from the drive circuit 11, causing resonance of the prong for driving and the prong for detection. With this oscillation of the tuning fork, charge is generated in the oscillation detection piezoelectric element Posc (i.e., the oscillation signal Sosc is generated). Also, once a rotational angular velocity occurs, an amount of charge responsive to the rotational angular velocity (Coriolis force) is generated in the angular velocity detection piezoelectric elements PDa and PDb (i.e., the sensor signal S10 is generated).

[Drive Circuit]

In the drive circuit 11, a monitor amplifier 11a converts the oscillation signal Sosc from the physical quantity sensor 10 to a voltage. An automatic gain control amplifier (AGC) 11b changes its amplification gain so that the voltage supplied to a drive amplifier 11c is kept constant. The drive amplifier 11c controls the frequency and amplitude of the drive signal Sdrv according to the output of the AGC 11b. In this way, with the adjustment of the drive signal Sdrv according to the oscillation signal Sosc, the maximum oscillation amplitude and oscillation frequency of the physical quantity sensor 10 are kept constant.

[Physical Quantity Detection Circuit]

Figure 2:
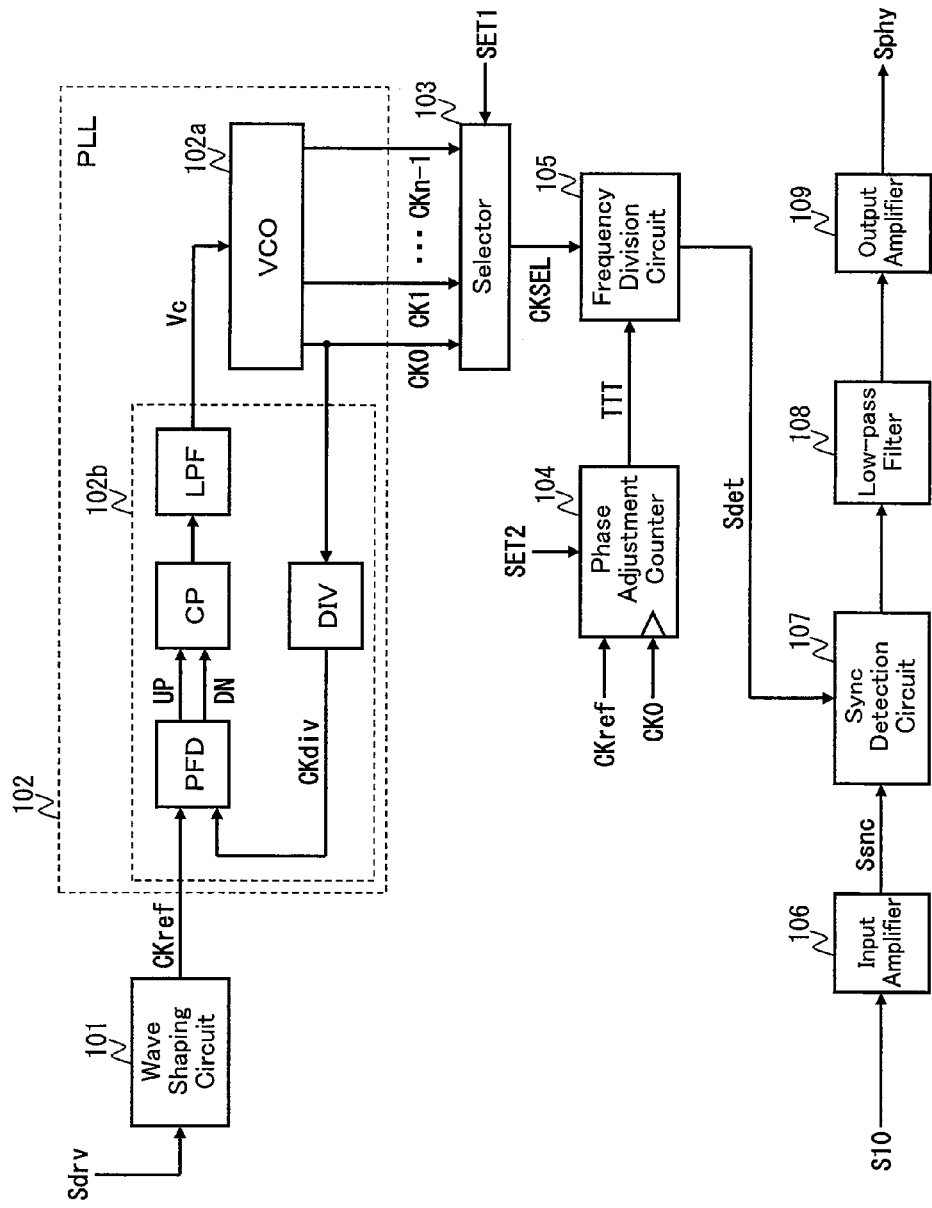
FIG. 2 is a block diagram showing an example configuration of a physical quantity detection circuit shown in FIG. 1.

FIG. 2 shows a configuration of the physical quantity detection circuit 12 shown in FIG. 1. The physical quantity detection circuit 12 includes a wave shaping circuit 101, a PLL circuit 102 including a voltage controlled oscillation circuit (VCO) 102a and an oscillation control circuit 102b, a selector 103, a phase adjustment counter 104 (phase adjustment circuit), a frequency division circuit 105, an input amplifier 106, a sync detection circuit 107, a low-pass filter 108, and an output amplifier 109.

The wave shaping circuit 101 converts the drive signal Sdrv to a square wave and outputs the resultant signal as a reference clock CKref. The wave shaping circuit 101 is constructed of a comparator and an inverter, for example. The frequency of the reference clock CKref is substantially the same as the frequency of the drive signal Sdrv (i.e., the frequency of the sensor signal S10).

Figure 3:
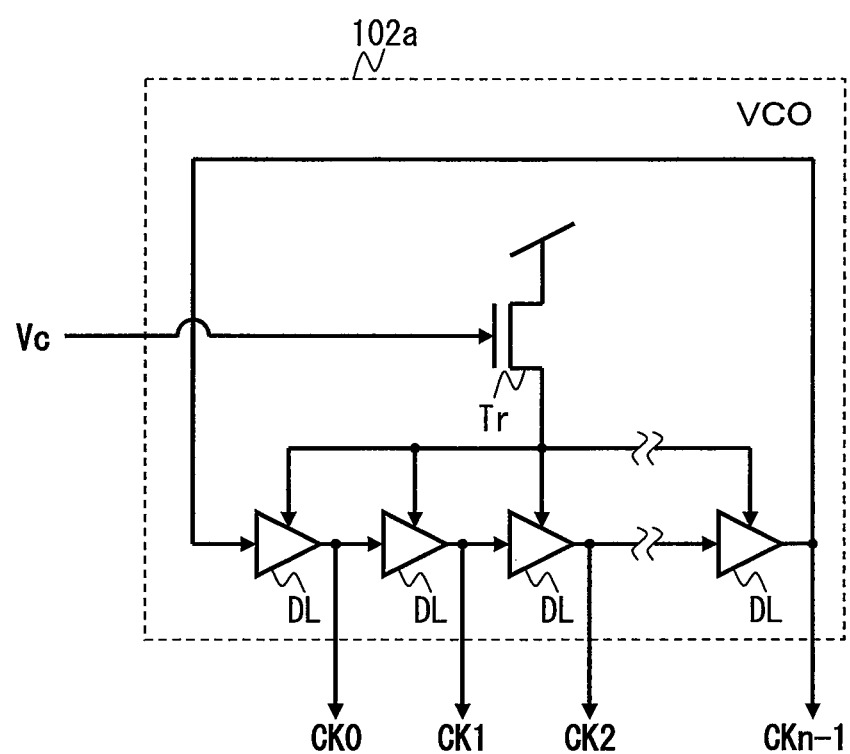
FIG. 3 is a view showing an example configuration of a voltage controlled oscillation circuit shown in FIG. 2.

As shown in FIG. 3, the voltage controlled oscillation circuit 102a includes: n (n is an integer equal to or more than 2) delay elements DL, DL, . . . connected in a loop; and a transistor Tr that supplies a current corresponding to a control voltage Vc to the delay elements DL, DL, . . . , to generate n oscillated clocks CK0, CK1, . . . , CKn−1 having different phases. Specifically, the oscillated clocks CK0, CK1, . . . , CKn−1 are deviated in phase by "t" each, where "t" is the delay time of each of the delay elements DL, DL, . . . .

Referring back to FIG. 2, the oscillation control circuit 102b increases/decreases the control voltage Vc based on the phase difference between the reference clock CKref from the wave shaping circuit 101 and the oscillated clock CK0 from the voltage controlled oscillation circuit 102a, to control the delay time of the delay elements DL, DL, . . . of the voltage controlled oscillation circuit 102a. The oscillation control circuit 102b includes, for example: a low-pass filter (LPF) that generates the control voltage Vc; a frequency divider (DIV) that divides the frequency of the oscillated clock CK0 to generate a divided clock CKdiv; a phase frequency detection circuit (PFD) that outputs a charge signal UP or a discharge signal DN based on the phase difference between the reference clock CKref and the divided clock CKdiv; and a charge pump (CP) that increases or decreases the control voltage Vc at the low-pass filter according to the charge signal UP or the discharge signal DN. By adjusting the control voltage Vc in this way, the delay time "t" of the delay elements DL is set to "T/n" where "T" is the period of the oscillated clock CK0.

The selector 103 selects one of the oscillated clocks CK0, CK1, . . . , CKn−1 according to a set value SET1 set under external control and outputs the selected oscillated clock as a selected clock CKSEL. The set value SET1 is a value for setting the delay time of the selected clock CKSEL with respect to the reference clock CKref.

The phase adjustment counter 104 starts counting the number of generated pulses of the oscillated clock CK0 in response to a transition edge (a rising edge in the illustrated example) of the reference clock CKref, and, once the count value reaches a set value SET2 set under external control, outputs a timing signal TTT. The set value SET2 is a value for setting the standby time from a transition edge of the reference clock CKref until start of detection, indicating the number of pulses of the oscillated clock CK0. The phase adjustment counter 104 is constructed of a plurality of flipflops and logic operators, for example.

The frequency division circuit 105 starts frequency division of the selected clock CKSEL in response to a transition edge of the timing signal TTT from the phase adjustment counter 104. The frequency division circuit 105 divides the frequency of the selected clock CKSEL to generate an analog detection signal Sdet having the same frequency as the reference clock CKref. For example, when the frequency of the selected clock CKSEL is 16 times as large as the frequency of the reference clock CKref, the frequency division circuit 105 divides the frequency of the selected clock CKSEL by 16.

The input amplifier 106 converts the sensor signal S10 from the physical quantity sensor 10 to a voltage and outputs the voltage as an analog sensor signal Ssnc.

The sync detection circuit 107 detects a physical quantity signal (signal corresponding to the physical quantity sensed by the physical quantity sensor 10) from the analog sensor signal Ssnc obtained by the input amplifier 106 using the analog detection signal Sdet from the frequency division circuit 105.

The low-pass filter 108 allows only a low-frequency component of the physical quantity signal detected by the sync detection circuit 107 to pass therethrough for noise removal and the like. The output amplifier 109 amplifies the physical quantity signal processed by the low-pass filter 108 and outputs the resultant signal as an analog detected signal Sphy.

[Operation]

Figure 4:
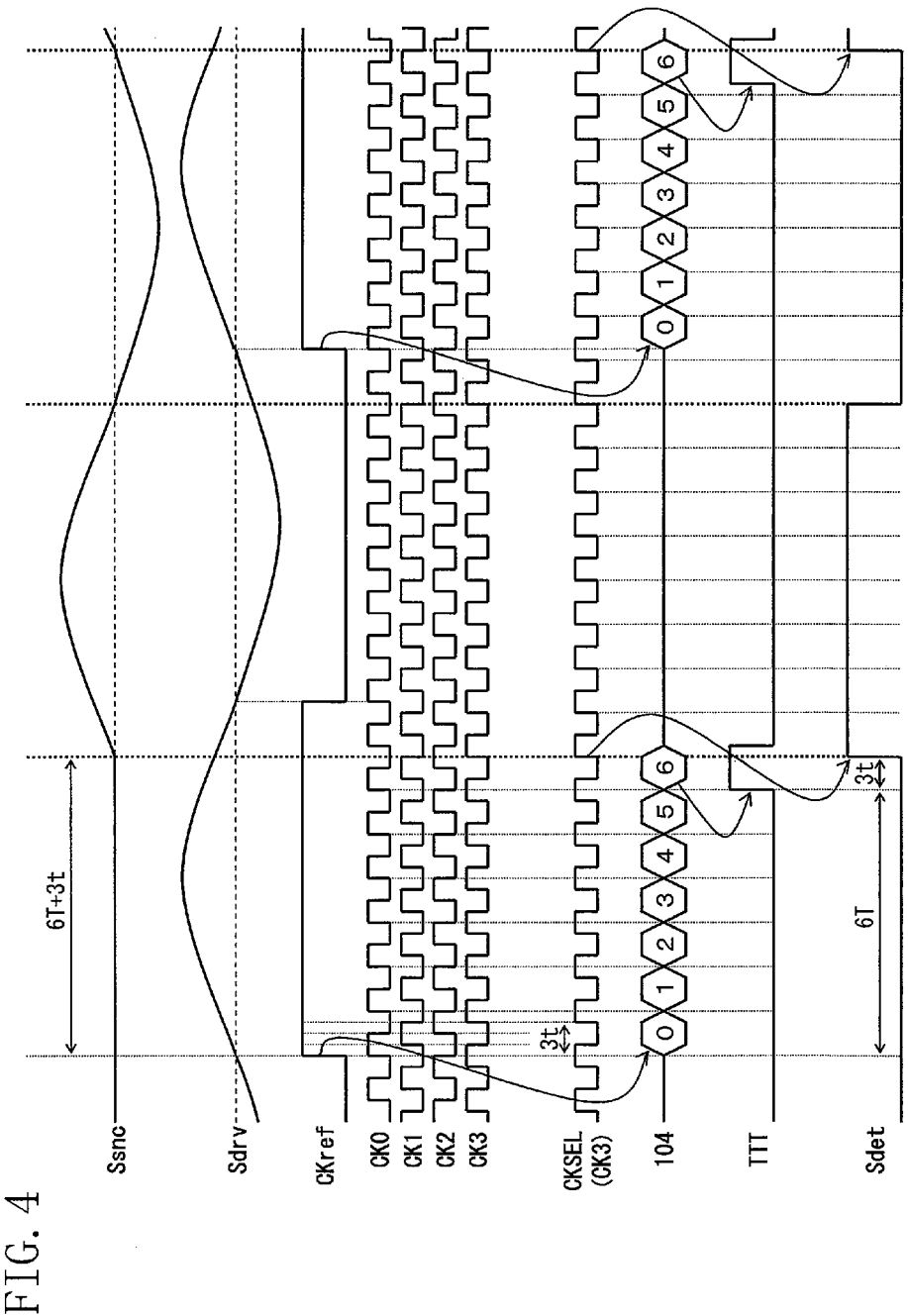
FIG. 4 is a timing chart illustrating the operation of the physical quantity detection circuit of FIG. 2.

Next, the operation of the physical quantity detection circuit 12 of FIG. 2 will be described with reference to FIG. 4. In the illustrated example, assume that the number of delay elements DL included in the voltage controlled oscillation circuit 102a is "4" and that the phase of the analog sensor signal Ssnc lags behind the phase of the drive signal Sdrv (i.e., the phase of the reference clock CKref) by "6T+3t."

The wave shaping circuit 101 converts the drive signal Sdrv to the reference clock CKref, and the voltage controlled oscillation circuit 102a generates the oscillated clocks CK0, CK1, CK2, and CK3. The phase adjustment counter 104 starts counting the number of generated pulses of the oscillated clock CK0 in response to a transition edge of the reference clock CKref.

When the set value SET1 is set to "3," the selector 103 selects the third oscillated clock CK3 as the selected clock CKSEL. With this setting, the delay time of the selected clock CKSEL can be set to "3t" that is equivalent to the delay time of three delay elements DL of the voltage controlled oscillation circuit 102a.

Also, when the set value SET2 is set to "6," the phase adjustment counter 104 outputs the timing signal TTT once the count value reaches "6". The frequency division circuit 105 starts frequency division of the selected clock CKSEL after occurrence of a transition edge of the timing signal TTT. In other words, the standby time from a transition edge of the reference clock CKref until start of detection (start of generation of the analog detection signal Sdet) can be set to "6T" that is equivalent to six periods of the oscillated clock CK0.

In the manner described above, the analog detection signal Sdet can be made in phase with the analog sensor signal Ssnc. Also, since the frequency of the analog detection signal Sdet is the same as that of the reference clock CKref, the sync detection circuit 107 multiplies the analog sensor signal Ssnc by the analog detection signal Sdet as it is, to detect the physical quantity signal.

As described above, the phase of the analog detection signal Sdet can be set using the phase shift amount of the oscillated clocks CK0, CK1, . . . , CKn−1 (i.e., the delay time "t" of the delay elements DL) as the unit. The higher the frequency of the oscillated clocks, the more precise setting of the phase of the analog detection signal Sdet is possible. Also, the larger the number of delay elements DL, the more precise setting of the phase of the analog detection signal Sdet is possible. Thus, the phase relationship between the sensor signal and the detection signal can be adjusted more precisely than conventionally done, permitting improvement in detection precision.

The phase adjustment counter 104 can set the timing of generation of the analog detection signal Sdet using the period "T" of the oscillated clock CK0 as the unit. With this setting, the adjustment width of the detection signal can be widened, permitting further improvement in detection precision. Note that the phase adjustment counter 104 may operate in synchronization with any of the other oscillated clocks CK1, CK2, . . . , CKn−1 or the selected clock CKSEL, or may operate in synchronization with another clock having a frequency higher than the frequency of the reference clock CKref.

The phase of the detection signal may be adjusted by the digital circuits (the PLL circuit 102, the selector 103, and the phase adjustment counter 104), so that the robustness against fabrication variations and fluctuations of the ambient environment can be more enhanced than conventionally achieved. In other words, it is possible to reduce the error of the delay time caused by fabrication variations and fluctuations of the ambient environment.

First Variation of First Embodiment

Figure 5:
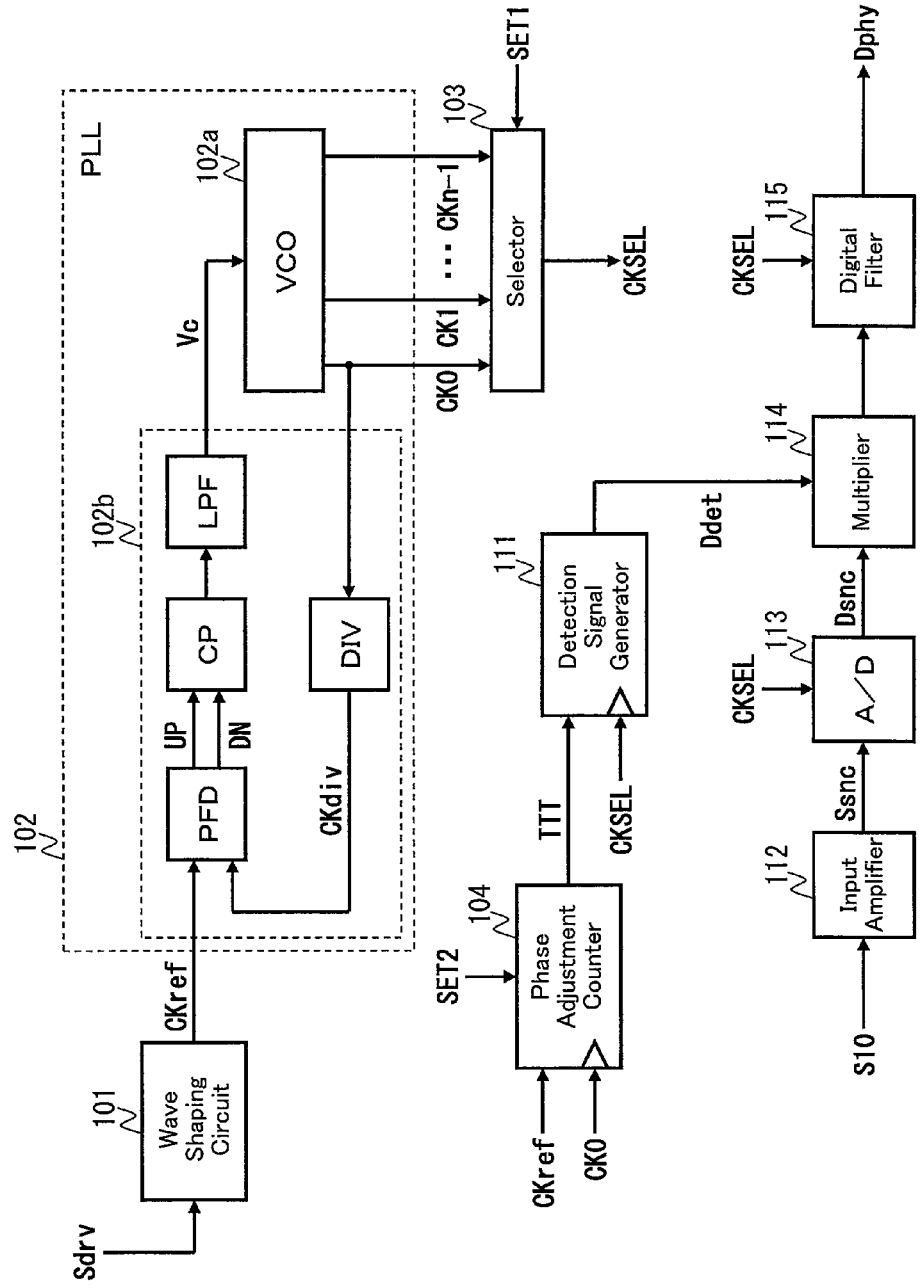
FIG. 5 is a block diagram showing an example configuration of a first variation of the physical quantity detection circuit of FIG. 2.

As shown in FIG. 5, the PLL circuit 102, the selector 103, and the phase adjustment counter 104 can also be used in a digitized physical quantity detection circuit. A physical quantity detection circuit 12a of FIG. 5 includes, in addition to the wave shaping circuit 101, the PLL circuit 102, the selector 103, and the phase adjustment counter 104 shown in FIG. 2, a detection signal generator 111, an input amplifier 112, an analog-to-digital converter (A/D) 113, a multiplier 114, and a digital filter 115.

The detection signal generator 111, operating in synchronization with the selected clock CKSEL from the selector 103, starts generating a digital detection signal Ddet corresponding to a sine wave signal in response to a transition edge of the timing signal TTT from the phase adjustment counter 104. The digital detection signal Ddet is constructed of a plurality of sine wave data units, which respectively correspond to a plurality of analog values (amplitude values) obtained by sampling a sine wave signal having a predetermined frequency (e.g., the drive signal Sdrv) in synchronization with a predetermined clock (e.g., the selected clock CKSEL). For example, the plurality of sine wave data units represent ideal amplitude values expressed by a sine function.

The input amplifier 112 converts the sensor signal S10 received from the physical quantity sensor 10 to a voltage and outputs the voltage as the analog sensor signal Ssnc. The analog-to-digital converter 113 samples the analog sensor signal Ssnc in synchronization with the selected clock CKSEL from the selector 103 and converts sampled analog values (amplitude values) to digital values. In this way, the analog sensor signal Ssnc is converted to a digital sensor signal Dsnc that is constructed of a plurality of digital values.

The multiplier 114 multiplies the digital sensor signal Dsnc obtained by the analog-to-digital converter 113 by the digital detection signal Ddet generated by the detection signal generator 111. With this multiplication, a physical quantity signal is detected. The digital filter 115, operating in synchronization with the selected clock CKSEL, allows only a low-frequency component of the physical quantity signal detected by the multiplier 114 to pass therethrough as a digital detected signal Dphy for noise removal and the like.

[Operation]

Figure 6:
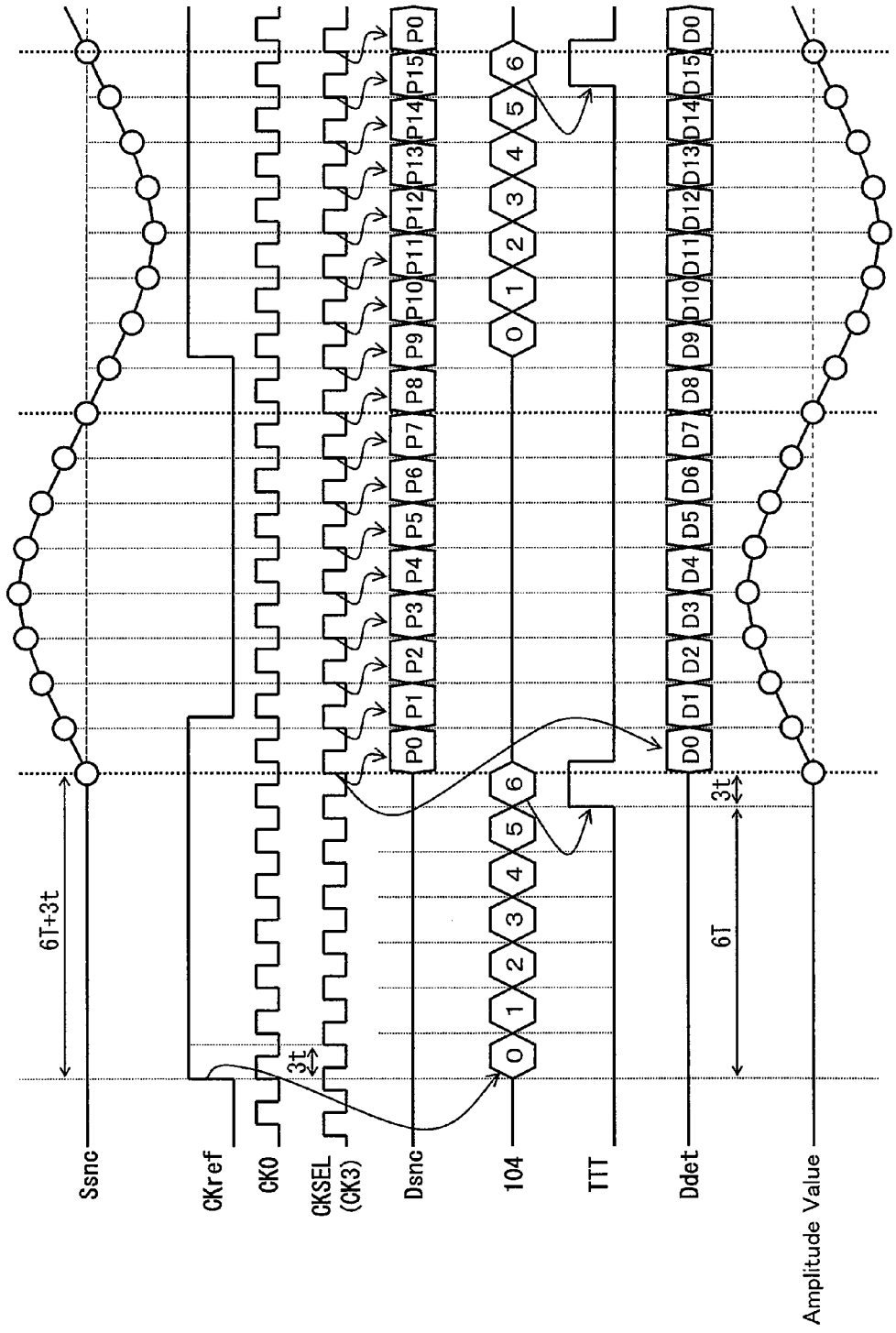
FIG. 6 is a timing chart illustrating the operation of the physical quantity detection circuit of FIG. 5.

Next, the operation of the physical quantity detection circuit 12a of FIG. 5 will be described with reference to FIG. 6. Note that the processing by the wave shaping circuit 101, the PLL circuit 102, the selector 103, and the phase adjustment counter 104 is the same as that shown in FIG. 4.

The analog-to-digital converter 113 converts the analog sensor signal Ssnc to digital values P0, P1, P2, . . . in synchronization with the selected clock CKSEL. The detection signal generator 111 outputs sine wave data units D0, D1, D2, . . . in rotation in synchronization with the selected clock CKSEL from the selector 103 after the timing signal TTT is output from the phase adjustment counter 104. The multiplier 114 multiplies the digital values P0, P1, P2, . . . from the analog-to-digital converter 113 by the sine wave data units D0, D1, D2, . . . from the detection signal generator 113, respectively.

As described above, by digitizing the physical quantity detection circuit, the robustness against fabrication variations and fluctuations in the surrounding environment can be enhanced, permitting further enhancement in detection precision.

Like the physical quantity detection circuit 12 of FIG. 2, the phase of the digital detection signal Ddet can be set using the phase shift amount of the oscillated clocks CK0, CK1, . . . , CKn−1 as the unit. Also, the standby time from a transition edge of the reference clock CKref until start of detection (start of generation of the digital detection signal Ddet) can be set using the period of the oscillated clock CK0 as the unit.

Moreover, by adjusting the phase of the selected clock CKSEL, the sampling timing of the analog-to-digital converter 113 can be changed. As a result, with a shift of the sampling point of the analog sensor signal Ssnc, the phase of the digital sensor signal Dsnc can be changed. This makes it possible to improve the precision of the phase adjustment while suppressing increase in the sampling frequency in the analog-to-digital converter 113. Also, since the sampling timing of the analog-to-digital converter 113 (i.e., a transition edge of the selected clock CKSEL) can be made to coincide with (or approximate to) a desired sampling point, the precision of analog-to-digital conversion can be improved.

The detection signal generator 111 and the digital filter 115 may otherwise operate in synchronization with any of the oscillated clocks CK0 to CKn−1.

Second Variation of First Embodiment

Figure 7:
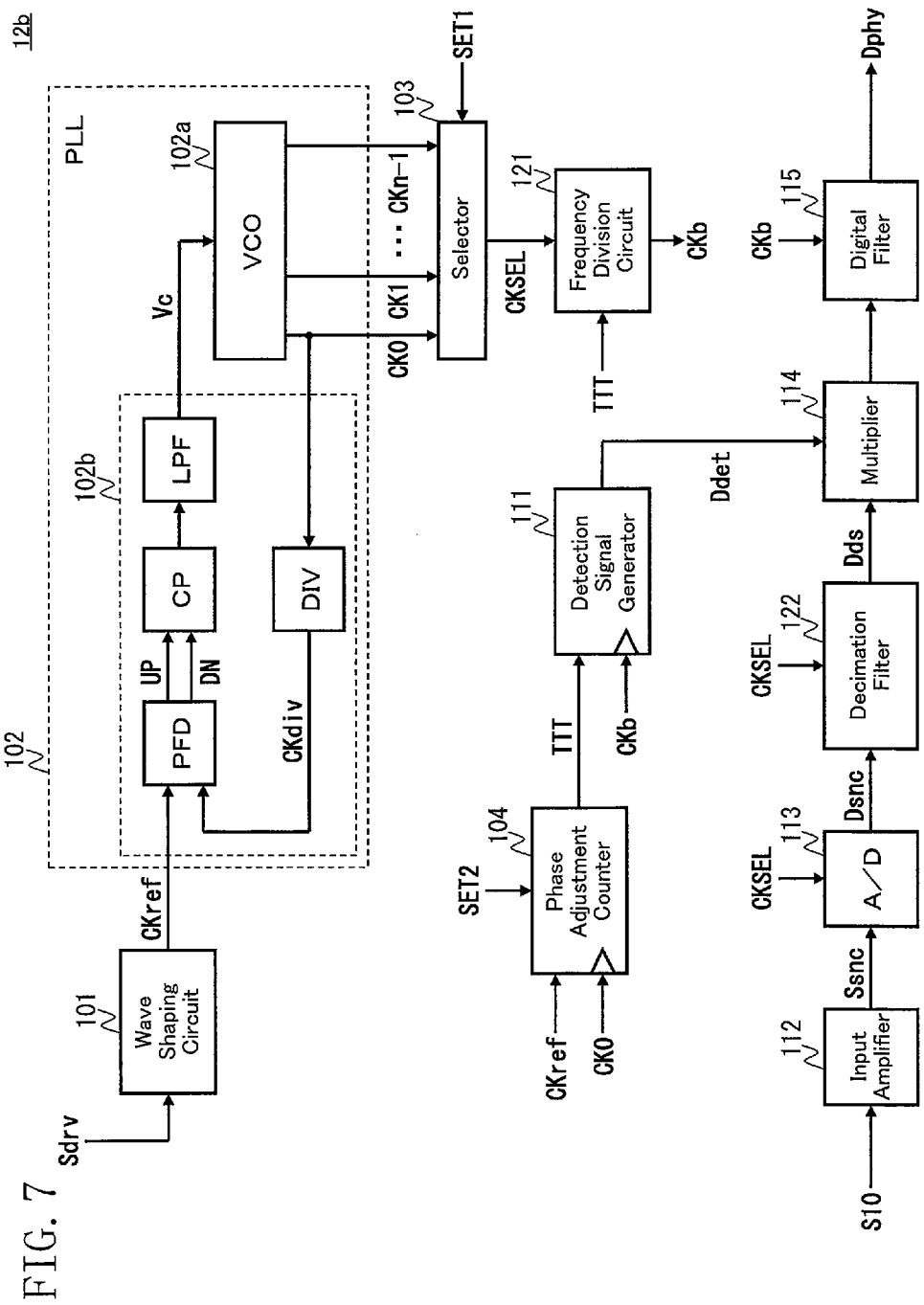
FIG. 7 is a block diagram showing an example configuration of a second variation of the physical quantity detection circuit of FIG. 2.

As shown in FIG. 7, the PLL circuit 102, the selector 103, and the phase adjustment counter 104 can also be used in an over-sampling physical quantity detection circuit. A physical quantity detection circuit 12b of FIG. 7 includes a frequency division circuit 121 and a decimation filter 122 in addition to the components shown in FIG. 5.

The frequency division circuit 121 starts frequency division of the selected clock CKSEL in response to a transition edge of the timing signal TTT from the phase adjustment counter 104, to generate an operation clock CKb having a frequency lower than the frequency of the selected clock CKSEL. The detection signal generator 111 and the digital filter 115 operate in synchronization with the operation clock CKb from the frequency division circuit 121.

The decimation filter 122, operating in synchronization with the selected clock CKSEL, executes decimation processing (low-pass filtering, decimation of digital values, etc.) for the digital sensor signal Dsnc, to convert the digital sensor signal Dsnc corresponding to the selected clock CKSEL to a digital sensor signal Dds corresponding to the operation clock CKb. For example, the decimation filter 122 decimates the digital sensor signal Dsnc, eliminating every other digital value, to output the digital values P0, P2, P4, . . . as the digital sensor signal Dds. The multiplier 114 multiplies the digital sensor signal Dds (digital values P0, P2, P4, . . . ) from the decimation filter 122 by the digital detection signal Ddet (sine wave data units D0, D2, D4, . . . ) from the detection signal generator 111.

As described above, with the operation clock CKb synchronizing with the selected clock CKSEL generated by the frequency division circuit 121, the detection signal generator 111 and the decimation filter 122 can operate in synchronization with each other. Hence, the multiplier 114 can detect the physical quantity signal correctly.

The analog-to-digital converter 113 may operate in synchronization with any of the oscillated clocks CK0, CK1, . . . , CKn−1.

Second Embodiment

Figure 8:
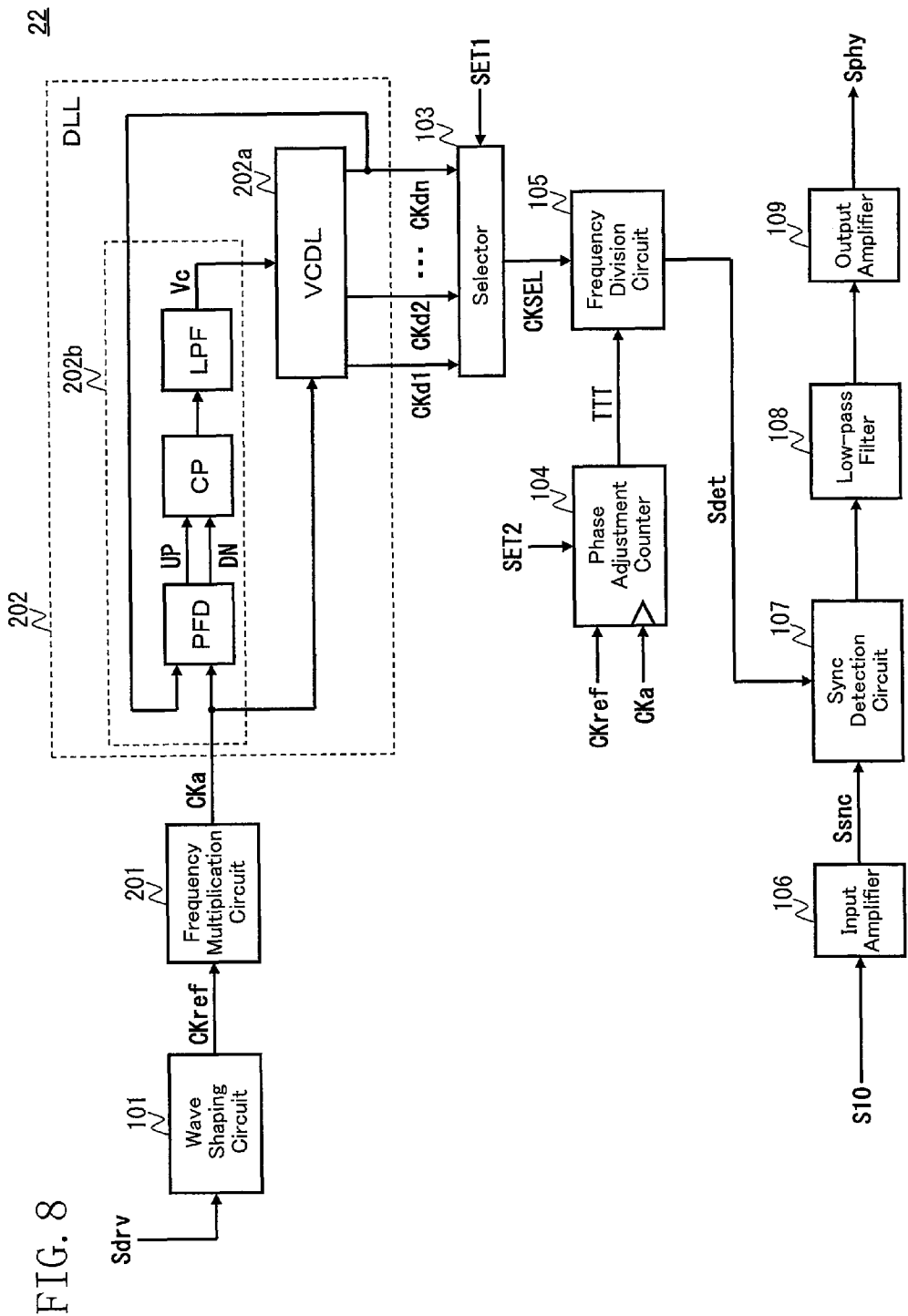
FIG. 8 is a block diagram showing an example configuration of a physical quantity detection circuit of a second embodiment.

FIG. 8 shows a configuration of a physical quantity detection circuit of a second embodiment. The physical quantity detection circuit 22 of this embodiment is used for the physical quantity sensor device in place of the physical quantity detection circuit 12 shown in FIG. 1, and includes a frequency multiplication circuit 201 and a DLL circuit 202 including a voltage controlled delay circuit (VCDL) 202a and a delay control circuit 202b, in place of the PLL circuit 102 shown in FIG. 2. The other configuration is similar to that of FIG. 2.

The frequency multiplication circuit 201 multiplies the reference clock CKref to generate a multiplied clock CKa. The frequency multiplication circuit 201 is constructed of a PLL circuit, for example.

Figure 9:
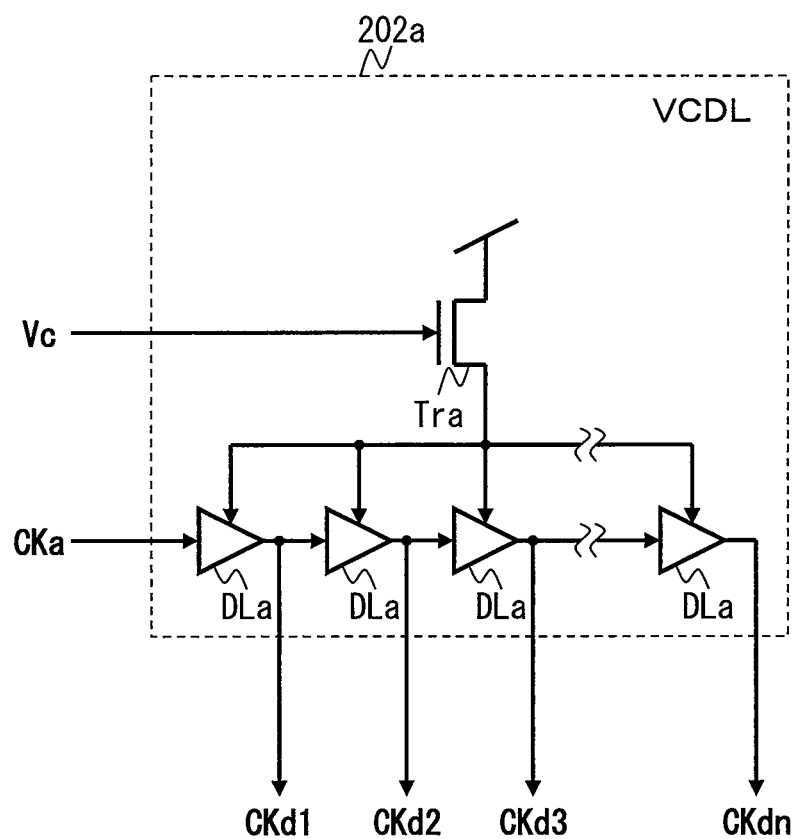
FIG. 9 is a view showing an example configuration of a voltage controlled delay circuit shown in FIG. 8.

As shown in FIG. 9, the voltage controlled delay circuit 202a includes: n cascade-connected delay elements DLa, DLa, . . . ; and a transistor Tra for supplying a current corresponding to a control voltage Vc to the delay elements DLa, DLa, . . . , to generate n delayed clocks CKd1, CKd2, . . . , CKdn having different phases by delaying the multiplied clock CKa from the frequency multiplication circuit 201 sequentially. Specifically, the delayed clocks CKd1, CKd2, . . . , CKdn are different in phase by "t" each, where "t" is the delay time of each of the delay elements DLa, DLa, . . . .

Referring back to FIG. 8, the delay control circuit 202b increases/decreases the control voltage Vc based on the phase difference between the multiplied clock CKa and the delayed clock CKdn, to control the delay time of the n delay elements DLa, DLa, . . . of the voltage controlled delay circuit 202a. By adjusting the control voltage Vc in this way, the delay time "t" of the delay elements DLa is set to "T/n" where "T" is the period of the multiplied clock CKa.

The phase adjustment counter 104 starts counting the number of generated pulses of the multiplied clock CKa in response to a transition edge of the reference clock CKref.

[Operation]

Figure 10:
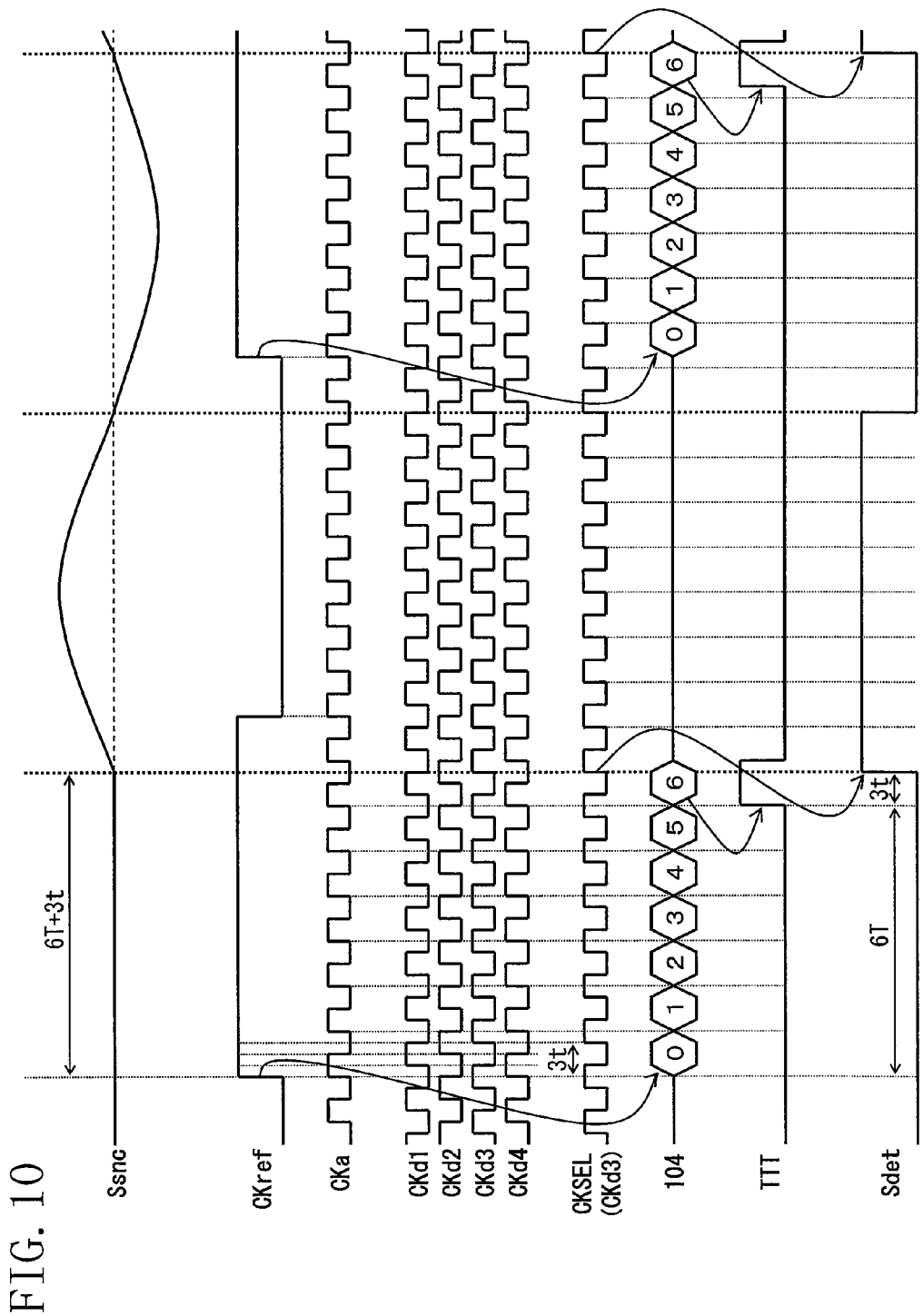
FIG. 10 is a timing chart illustrating the operation of the physical quantity detection circuit of FIG. 8.

Next, the operation of the physical quantity detection circuit 22 of FIG. 8 will be described with reference to FIG. 10. In the illustrated example, assume that the number of delay elements DLa included in the voltage controlled delay circuit 202a is "4" and that the phase of the analog sensor signal Ssnc lags behind the phase of the drive signal Sdrv (i.e., the phase of the reference clock CKref) by "6T+3t."

The wave shaping circuit 101 converts the drive signal Sdrv to the reference clock CKref, and the frequency multiplication circuit 201 generates the multiplied clock CKa based on the reference clock CKref. The voltage controlled delay circuit 202a generates the delayed clocks CKd1, CKd2, CKd3, and CKd4. The phase adjustment counter 104 starts counting the number of generated pulses of the multiplied clock CKa in response to a transition edge of the reference clock CKref.

When the set value SET1 is set to "3," the selector 103 selects the third delayed clock CKd3 as the selected clock CKSEL. With this setting, the delay time of the selected clock CKSEL can be set to "3t" that is equivalent to the delay time of three delay elements DLa of the voltage controlled delay circuit 202a.

Also, by setting the set value SET2 to "6," the standby time from a transition of the reference clock CKref until start of frequency division can be set to "6T" that is equivalent to six periods of the multiplied clock CKa.

As described above, the phase of the analog detection signal Sdet can be set using the phase shift amount of the delayed clocks CKd1, CKd2, . . . , CKdn (i.e., the delay time "t" of the delay elements DLa) as the unit. The higher the frequency of the multiplied clock CKa, the more precise setting of the phase of the analog detection signal Sdet is possible. Also, the larger the number of delay elements DLa, the more precise setting of the phase of the analog detection signal Sdet is possible. Thus, the phase relationship between the sensor signal and the detection signal can be adjusted more precisely than conventionally done, permitting improvement in detection precision.

Also, since the output timing of the analog detection signal Sdet can be set using the period "T" of the multiplied clock CKa as the unit, the adjustment width of the detection signal can be widened. Note that the phase adjustment counter 104 may operate in synchronization with any of the delayed clocks CKd1, CKd2, . . . , CKdn or the selected clock CKSEL, or may operate in synchronization with another clock having a frequency higher than the frequency of the reference clock CKref.

The phase of the detection signal may be adjusted by the digital circuits (the DLL circuit 202 and the selector 103), so that the robustness against fabrication variations and fluctuations of the ambient environment can be more enhanced than conventionally achieved.

Although the voltage controlled delay circuit 202a and the delay control circuit 202b receive the reference clock CKref from the wave shaping circuit 101 via the frequency multiplication circuit 201 in the illustrated example, they may receive the reference clock CKref not via the frequency multiplication circuit 201.

Variation of Second Embodiment

Figure 11:
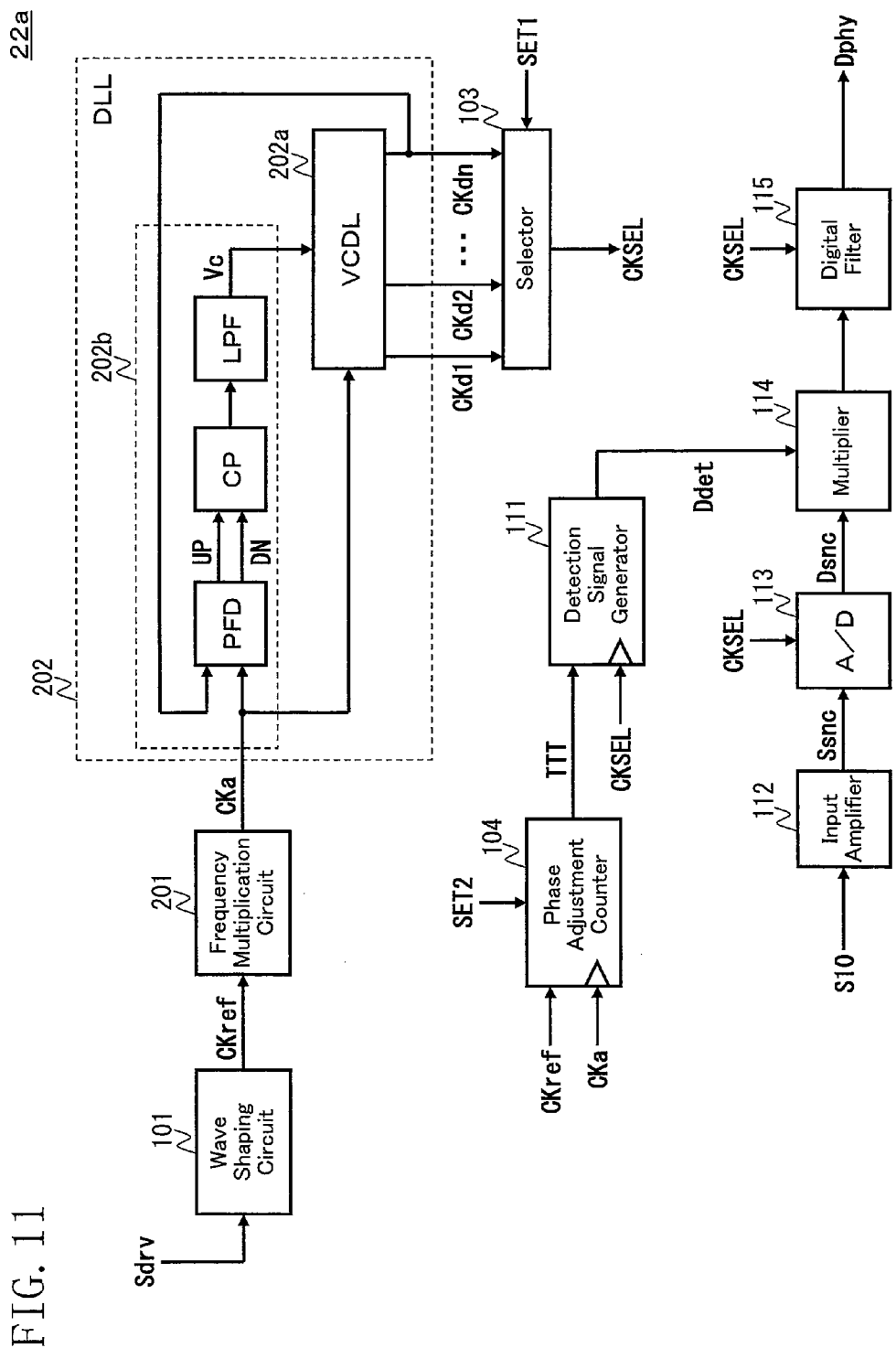
FIG. 11 is a block diagram showing a variation of the physical quantity detection circuit of FIG. 8.

As shown in FIG. 11, the DLL circuit 202, the selector 103, and the phase adjustment counter 104 can also be used in a digitized physical quantity detection circuit. A physical quantity detection circuit 22a of FIG. 11 includes the frequency multiplication circuit 201 and the DLL circuit 202 shown in FIG. 8, in place of the PLL circuit 102 shown in FIG. 5. The other configuration is similar to that of FIG. 5.

Moreover, the physical quantity detection circuit 22a of FIG. 11 may further include the frequency division circuit 121 and the decimation filter 122 shown in FIG. 7. In other words, the DLL circuit 202 and the selector 103 can also be used in an over-sampling physical quantity detection circuit.

Third Embodiment

Figure 12:
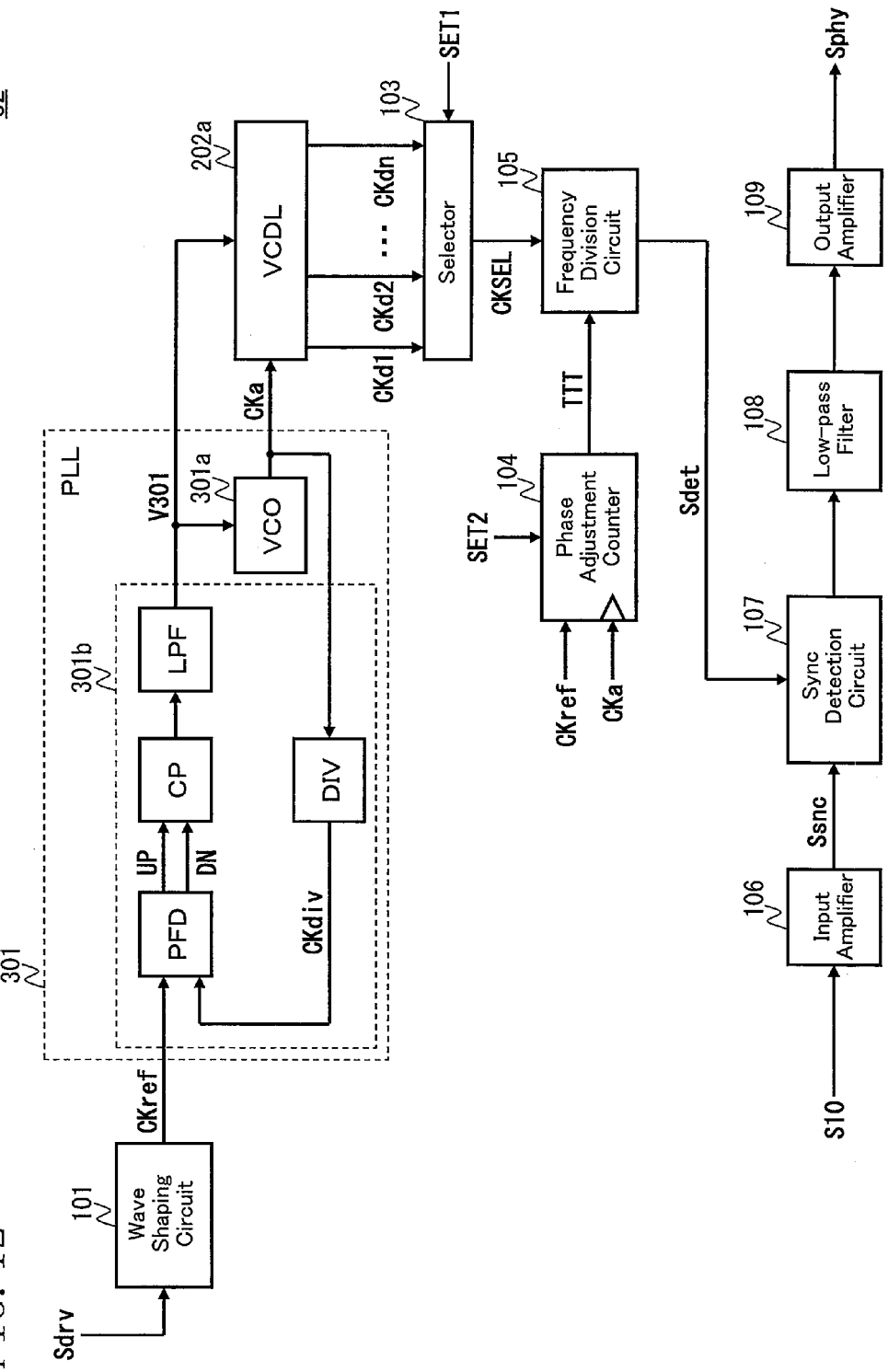
FIG. 12 is a block diagram showing an example configuration of a physical quantity detection circuit of a third embodiment.

FIG. 12 shows a configuration of a physical quantity detection circuit of a third embodiment. The physical quantity detection circuit 32 of this embodiment is used for the physical quantity sensor device in place of the physical quantity detection circuit 12 shown in FIG. 1, and includes a PLL circuit 301 including a voltage controlled oscillation circuit (VCO) 301a and an oscillation control circuit 301b, in place of the frequency multiplication circuit 201 and the delay control circuit 202b shown in FIG. 8. The other configuration is similar to that of FIG. 8.

The voltage controlled oscillation circuit 301a generates a multiplied clock CKa having a frequency corresponding to a control voltage V301 from the oscillation control circuit 301b. The oscillation control circuit 301b increases/decreases the control voltage V301 based on the phase difference between the reference clock CKref from the wave shaping circuit 101 and the multiplied clock CKa from the voltage controlled oscillation circuit 301a. The control voltage V301 is also supplied to the voltage controlled delay circuit 202a.

In the voltage controlled delay circuit 202a, the higher the control voltage V301, the smaller the phase shift amount of the delayed clocks CKd1, CKd2, . . . , CKDn (i.e., the delay time "t" of the delay elements DLa) is. Thus, the phase relationship between the sensor signal and the detection signal can be adjusted more precisely than conventionally done, permitting improvement in detection precision.

Figure 13:
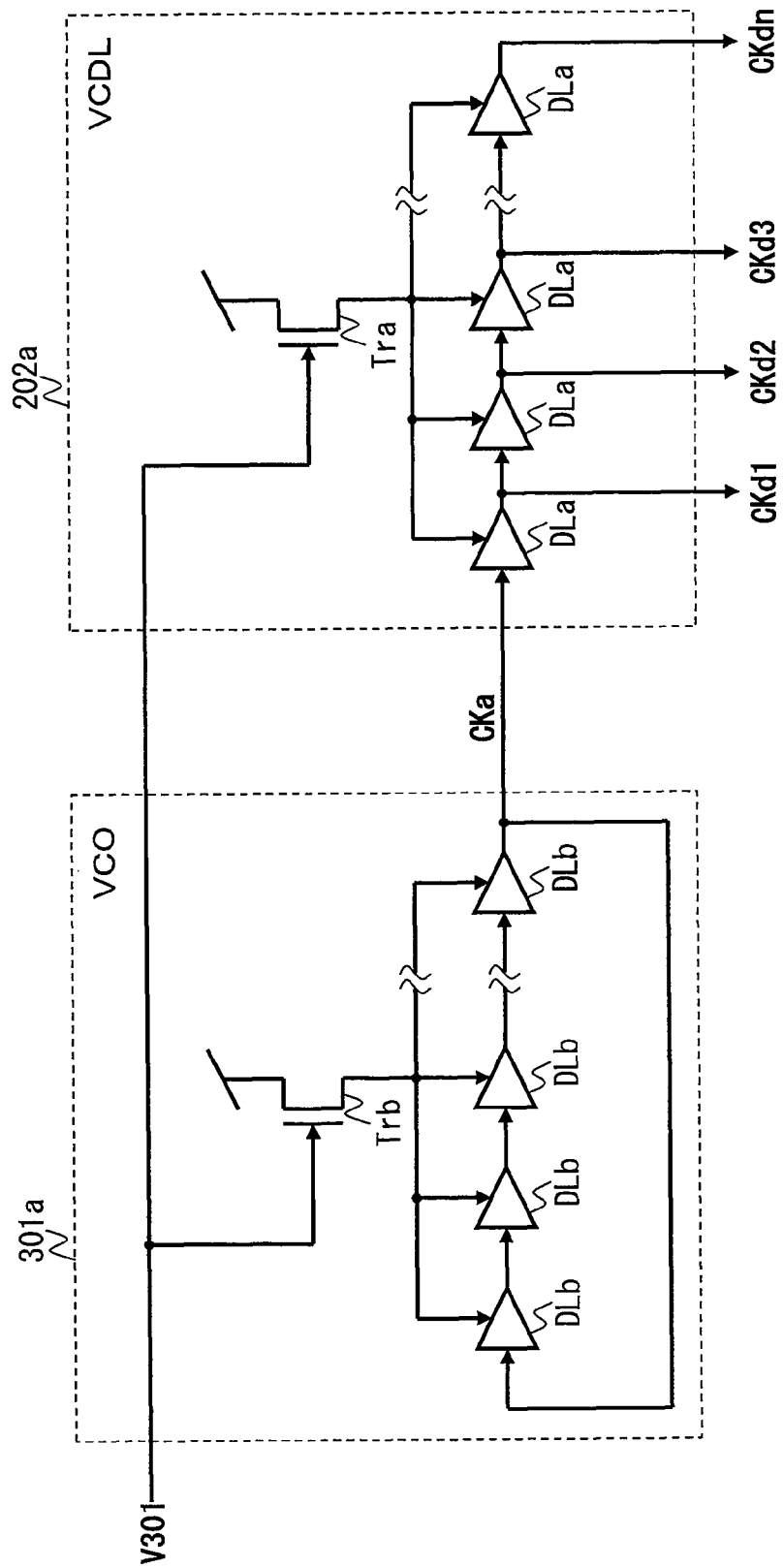
FIG. 13 is a view showing an example configuration of a voltage controlled oscillation circuit and a voltage controlled delay circuit shown in FIG. 12.

FIG. 13 shows a configuration of the voltage controlled oscillation circuit 301a and the voltage controlled delay circuit 202a shown in FIG. 12. The voltage controlled oscillation circuit 301a includes: a plurality of delay elements DLb, DLb, . . . connected in a loop; and a transistor Trb for supplying a current corresponding to the control voltage V301 to the delay elements DLb, DLb, . . . . The control voltage V301 is supplied to the transistor Trb and the transistor Tra of the voltage controlled delay circuit 202a. In other words, with fluctuations in the delay time of the delay elements DLb, the delay time of the delay elements DLa also fluctuates.

In the voltage controlled oscillation circuit 301a, with increase in the control voltage V301, the response speed of the delay elements DLb, DLb, . . . increases, shortening the delay time of the delay elements. As a result, the frequency of the multiplied clock CKa increases. In the voltage controlled delay circuit 202a, also, the response speed of the delay elements DLa, DLa, . . . increases with increase in the control voltage V301. As a result, the rate of rise and fall of the delayed clocks CKd1, CKd2, . . . , CKdn increases. Having such change in the rate of rise and fall of the delayed clocks CKd1, CKd2, . . . , CKdn from the voltage controlled delay circuit 202a along with change in the frequency of the multiplied clock CKa, it is possible to keep the waveform of the delayed clocks CKd1, CKd2, . . . , CKdn from being lost, permitting precise generation of the delayed clocks CKd1, CKd2, . . . , CKdn.

Variation of Third Embodiment

The frequency multiplication circuit 201 and the delay control circuit 202b shown in FIG. 11 may be replaced with the PLL circuit 301 shown in FIG. 12. In other words, the PLL circuit 301, the voltage controlled delay circuit 202a, and the selector 103 can also be used in a digitized physical quantity detection circuit and an over-sampling physical quantity detection circuit.

The physical quantity detection circuit 32 may not be provided with the PLL circuit 301. In this case, to the voltage controlled delay circuit 202a, the reference clock CKref is supplied in place of the multiplied clock CKa, and the control voltage V301 is supplied externally. With this configuration, also, the phase of the analog detection signal Sdet can be set using the phase shift amount of the delayed clocks CKd1, CKd2, . . . , CKDn (i.e., the delay time "t" of the delay elements DLa) as the unit.

(Phase Adjustment Circuit)

Figure 14:
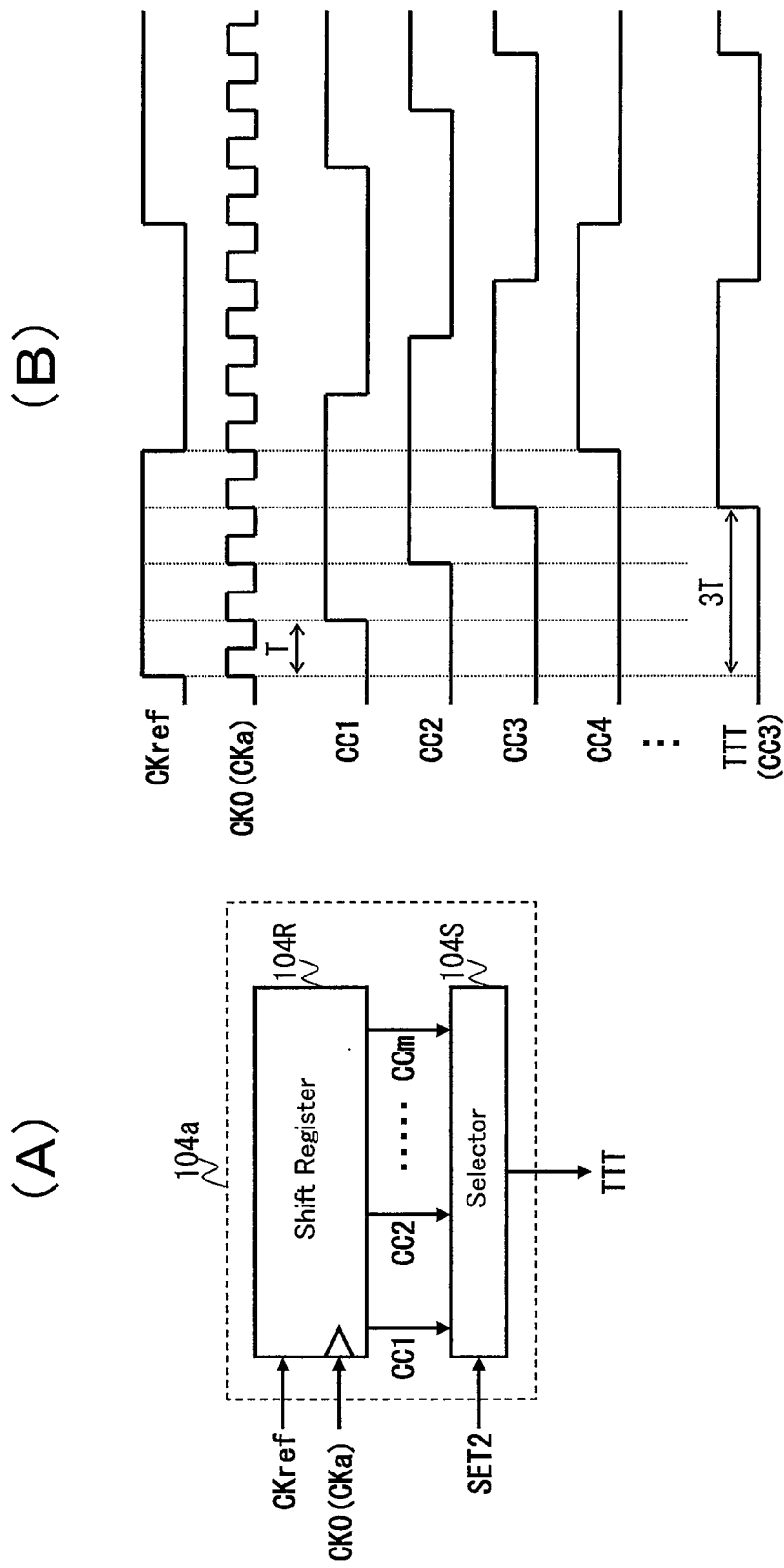
FIG. 14A is block diagram showing an example configuration of a phase adjustment circuit.
FIG. 14B is a timing chart illustrating the operation of the phase adjustment circuit of FIG. 14A.

In each of the embodiments described above, the physical quantity detection circuit may include a phase adjustment circuit 104a as shown in FIG. 14A in place of the phase adjustment counter 104. The phase adjustment circuit 104a includes a shift register 104R and a selector 104S.

The shift register 104R shifts the reference clock CKref sequentially in synchronization with the oscillated clock CK0 (or the multiplied clock CKa), to generate m (m is an integer equal to or more than 2) delayed clocks CC1, CC2, . . . , CCm whose phases are shifted by a predetermined amount each. The selector 104S selects one of the delayed clocks CC1, CC2, . . . , CCm according to the set value SET2 set under external control, and outputs the selected delayed clock as the timing signal TTT. For example, when the set value SET2 is set to "3," the selector 104S selects the third delayed clock CC3 as the timing signal TTT (see FIG. 14B). With this selection, the standby time from a transition of the reference clock CKref until start of frequency division (or start of generation of the digital detection signal) can be set to "3T" that is equivalent to three periods of the oscillated clock CK0 (or the multiplied clock CKa).

The physical quantity detection circuit may not be provided with the phase adjustment counter 104. In this case, the reference clock CKref may be supplied to the frequency division circuit 105, the detection signal generator 111, and the frequency division circuit 121, in place of the timing signal TTT.

(Phase Frequency Converter)

Figure 15:
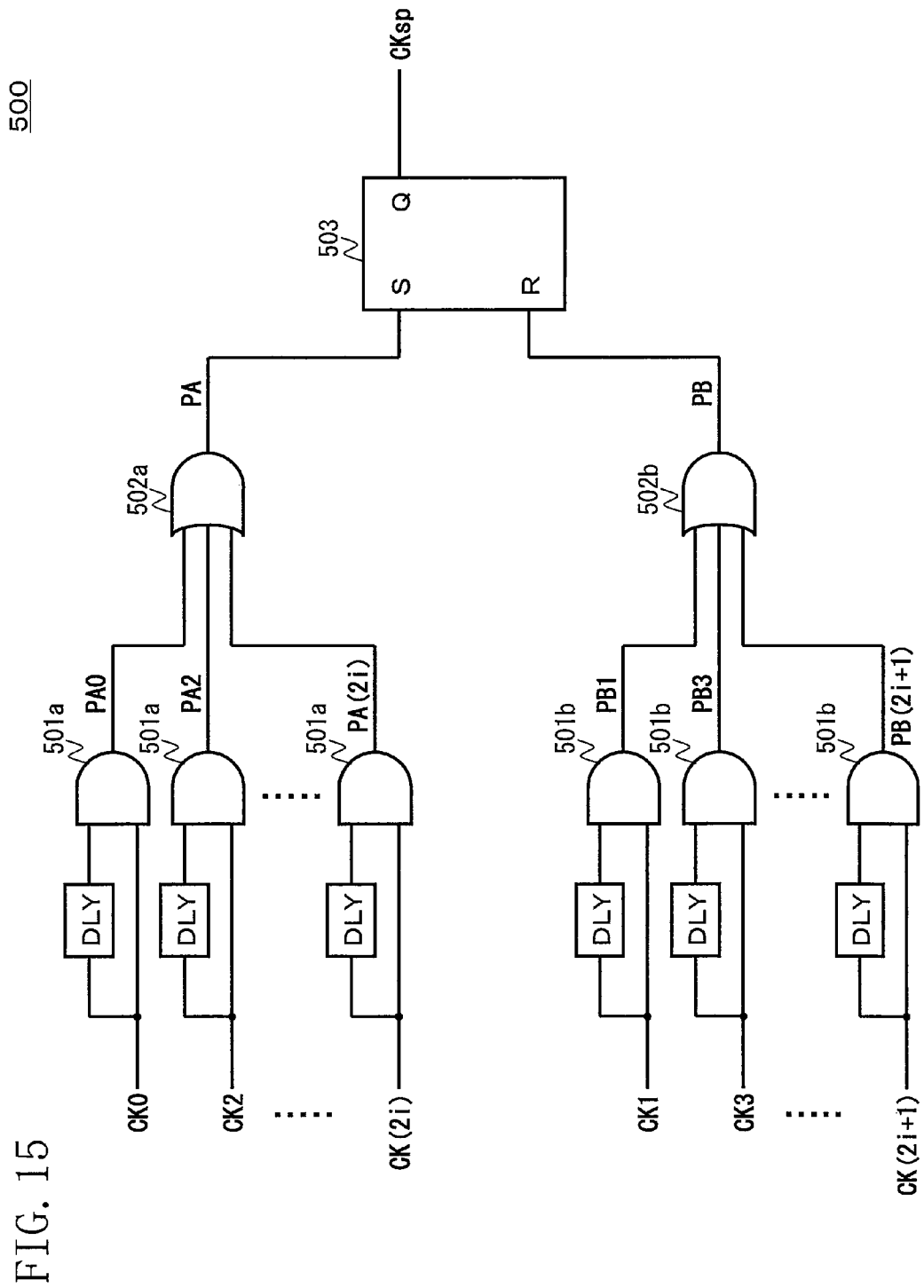
FIG. 15 is a block diagram showing an example configuration of a phase frequency converter.

A phase frequency converter 500 as shown in FIG. 15 may be used to generate a sampling clock CKsp supplied to the analog-to-digital converter 113. The phase frequency converter 500 generates the sampling clock CKsp based on 2i+2 ($4 \leq 2i+2 \leq n$) oscillated clocks CK0, CK1, CK2, . . . , CK(2i), CK(2b+1) from the voltage controlled oscillation circuit 102a. The phase frequency converter 500 includes, for example: (i+1) logic circuits 501a, 501a, . . . corresponding to the 0-th oscillated clock CK0 and the even-numbered oscillated clocks CK2, . . . , CK(2i); (i+1) logic circuits 501b, 501b, . . . corresponding to the odd-numbered oscillated clocks CK1, CK3, . . . , CK(2b+1); OR circuits 502a and 502b; and a flipflop 503.

Figure 16:
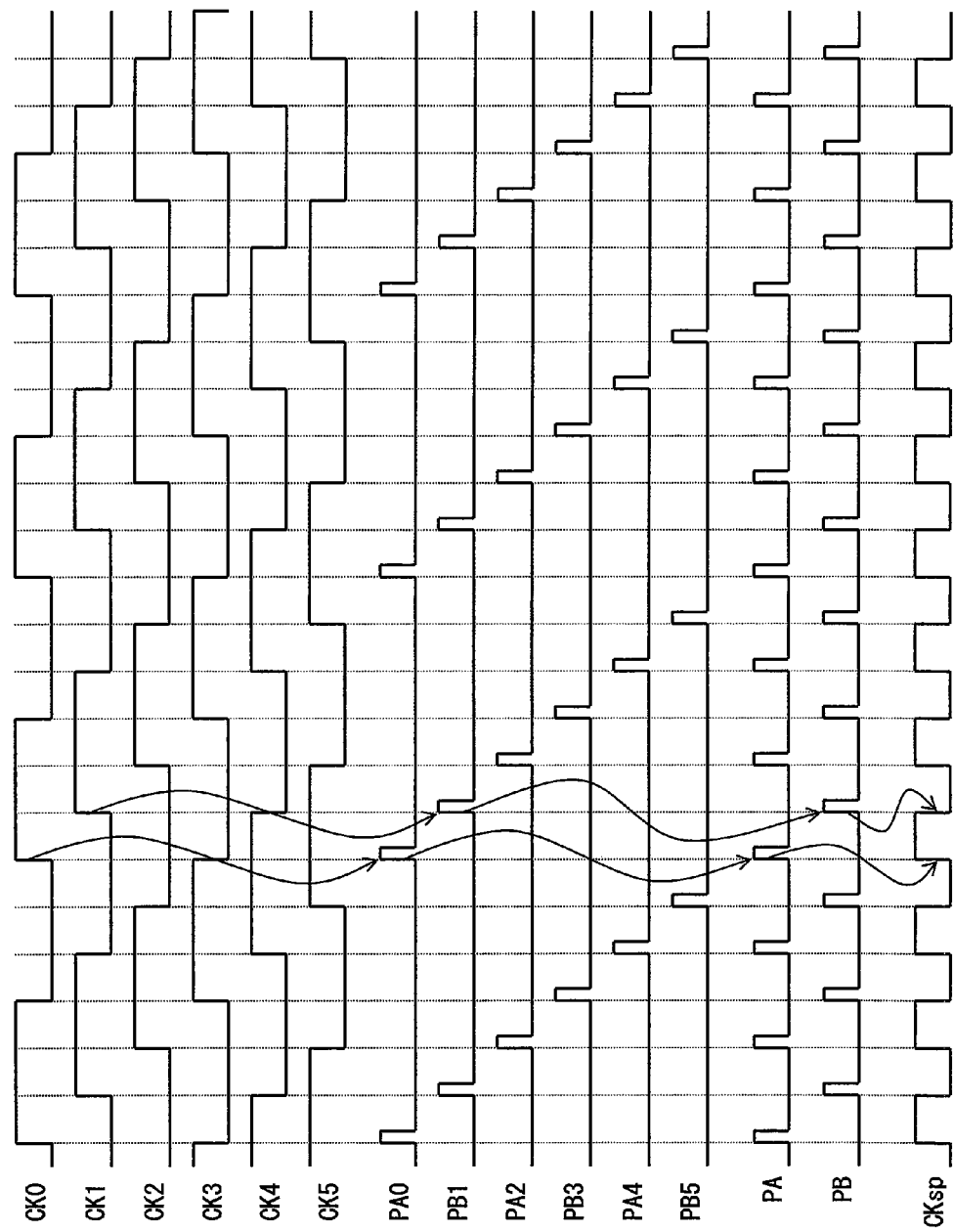
FIG. 16 is a timing chart illustrating the operation of the phase frequency converter of FIG. 15.

Referring to FIG. 16, frequency multiplication by the phase frequency converter 500 of FIG. 15 will be described. Assume in the illustrated example that i=2.

Once detecting a rising edge of their corresponding oscillated clocks CK0, CK2, . . . , CK(2i), the logic circuits 501a, 501a, . . . output pulse signals PA0, PA2, . . . , PA(2i). Likewise, once detecting a rising edge of their corresponding oscillated clocks CK1, CK3, ..., CK(2b+1), the logic circuits 501b, 501b, ... output pulse signals PB1, PB3, ..., PB(2b+1). The OR circuit 502a combines the pulse signals PA0, PA2, ..., PA(2i) and outputs the result as a combined signal PA, and the OR circuit 502b combines the pulse signals PB1, PB3, ..., PB(2i+1) and outputs the result as a combined signal PB. The flipflop 503 changes the logic level of the sampling clock CKsp from low to high in response to the rising edges of the combined signal PA, and from high to low in response to the rising edges of the combined signal PB.

As described above, the sampling clock CKsp having a frequency higher than the frequency of the oscillated clock CK0 can be supplied to the analog-to-digital converter 113, permitting improvement in the precision of analog-to-digital conversion. Also, since the burden on the PLL circuit 102 can be reduced, noise generation caused by frequency increase can be suppressed.

The phase frequency converter 500 can be used, not only in the voltage controlled oscillation circuit 102a, but also in the voltage controlled delay circuit 202a. For example, the logic circuits 501a, 501a, ... may correspond to the multiplied clock CKa and the even-numbered delayed clocks CKd2, ..., CKd(2i), and the logic circuits 501b, 501b, ... may correspond to the odd-numbered delayed clocks CKd1, CKd3, ..., CKd(2i+1).

Other Embodiments

Figure 17:
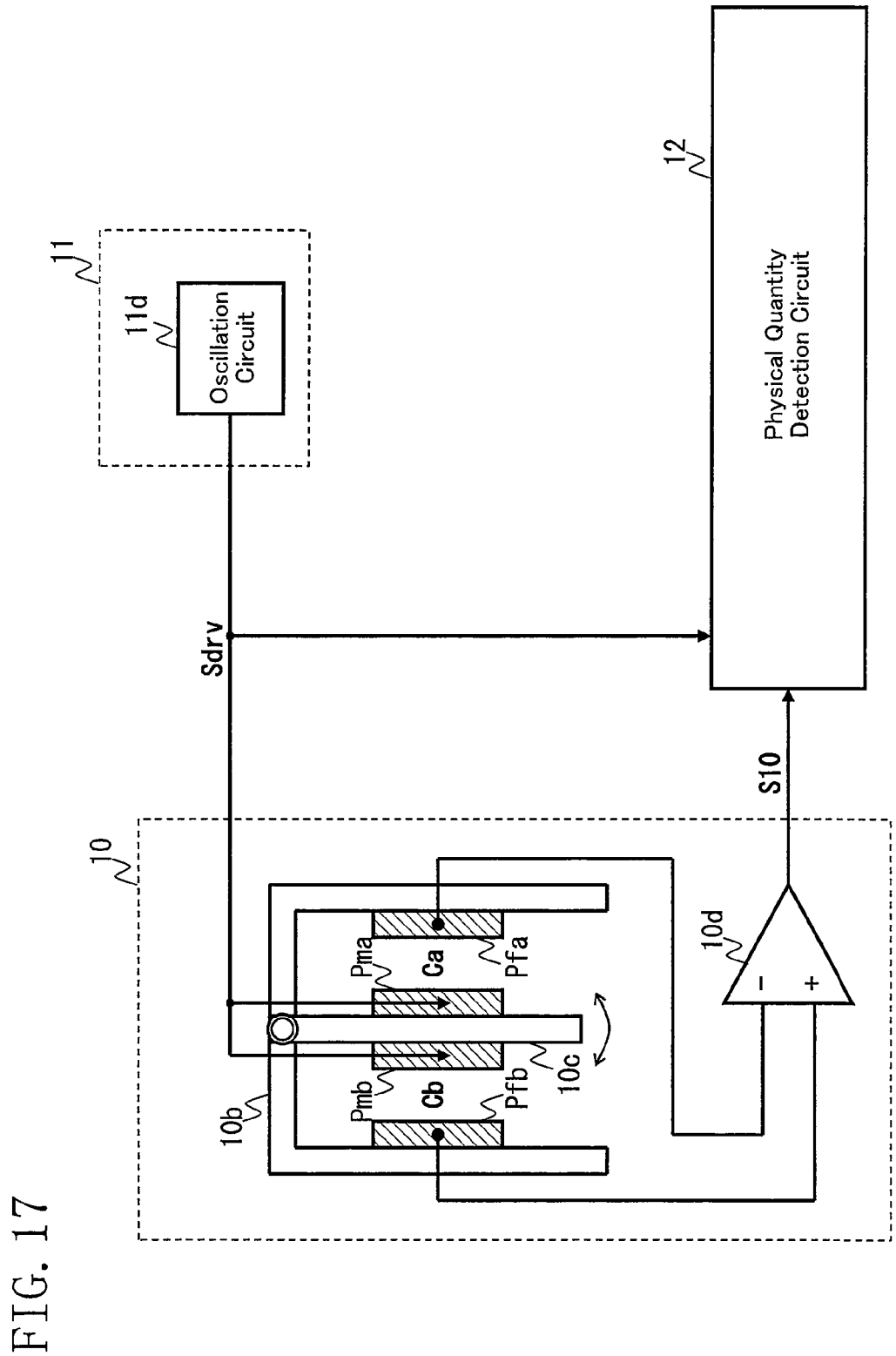
FIG. 17 is a view showing a variation of a physical quantity sensor.

The physical quantity sensor 10 in the above embodiments does not have to be of the tuning fork type, but may be of a circular cylinder type, a regular triangular prism type, a square prism type, or a ring type, or may be of another shape. Otherwise, as shown in FIG. 17, the physical quantity sensor 10 may be a capacitive acceleration sensor. In this case, the physical quantity sensor 10 includes a fixed portion 10b, a movable portion 10c, movable electrodes Pma and Pmb, detection electrodes Pfa and Pfb, and a differential amplifier 10d. The movable portion 10c is connected to the fixed portion 10b so that it can be displaced according to acceleration. The movable electrodes Pma and Pmb are placed on the movable portion 10c. The detection electrode Pfa and Pfb are placed on the fixed portion 10b so as to face the movable electrodes Pma and Pmb, respectively. That is, the movable electrode Pma and the detection electrode Pfa constitute a capacitor Ca, and the movable electrode Pmb and the detection electrode Pfb constitute a capacitor Cb. A drive signal Sdrv from an oscillation circuit 11d is supplied to the capacitors Ca and Cb. The differential amplifier 10d outputs a sensor signal S10 corresponding to the difference between the charge amounts generated in the detection electrodes Pfa and Pfb. Once acceleration occurs, one of the capacitances of the capacitors Ca and Cb increases while the other decreases, due to a displacement of the movable portion 10c. This causes a difference in charge amount between the detection electrodes Pfa and Pfb, and the sensor signal S10 corresponding to this difference is output.

In the above embodiments, the set values SET1 and SET2 are described as changeable values. Alternatively, the set values SET1 and SET2 may be fixed values.

The technologies disclosed in the present application, with which the phase relationship between the sensor signal and the detection signal can be adjusted precisely, are suitable for physical quantity sensors (e.g., tuning fork type angular velocity sensors, capacitive acceleration sensors, etc.) used in mobile units, cellular phones, digital cameras, game machines, and the like.

It should be noted that the embodiments described above are essentially preferred illustrations, and by no means intended to restrict the scope of the present invention, applications thereof, or uses thereof.

What is claimed is:

1. A physical quantity detection circuit used for a physical quantity sensor that outputs a sensor signal according to a physical quantity given externally, the circuit comprising:
   a PLL circuit configured to generate a plurality of oscillated clocks having different phases;
   a selector configured to select one of the plurality of oscillated clocks generated by the PLL circuit; and
   a detection circuit configured to detect a physical quantity signal corresponding to the physical quantity from the sensor signal based on the oscillated clock selected by the selector,
   wherein the PLL circuit includes:
      an oscillation circuit including a plurality of delay elements connected in a loop, configured to output the outputs of the plurality of delay elements as the plurality of oscillated clocks,
      a low-pass filter configured to generate a control voltage for controlling the delay time of the plurality of delay elements,
      a frequency divider configured to divide the frequency of one of the plurality of oscillated clocks to generate a divided clock,
      a phase detection circuit configured to detect a phase difference between a reference clock corresponding to the sensor signal and the divided clock, and
      a charge pump configured to increase/decrease the control voltage based on the phase difference detected by the phase detection circuit, and
   wherein the detection circuit includes:
   a frequency division circuit configured to divide the frequency of the oscillated clock selected by the selector, to generate an analog detection signal, and
   a sync detection circuit configured to detect the physical quantity signal from the sensor signal using the analog detection signal generated by the frequency division circuit.

2. The physical quantity detection circuit of claim 1, further comprising:
   a phase adjustment circuit, receiving the reference clock and operating in synchronization with an operation clock having a frequency higher than the frequency of the reference clock, configured to output a timing signal once a predetermined number of pulses of the operation clock has been generated after a transition edge of the reference clock,
   wherein the frequency division circuit starts generation of the analog detection signal in response to a transition edge of the timing signal.

* * * * *